(12) United States Patent
Schaal (10) Patent No.: US 11,305,618 B2
(45) Date of Patent: Apr. 19, 2022

(54) AIR VENT

(71) Applicant: Fischer automotive systems GmbH & Co. KG, Horb a.N. (DE)

(72) Inventor: Falk Schaal, Loßburg (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 82 days.

(21) Appl. No.: 16/936,270

(22) Filed: Jul. 22, 2020

(65) Prior Publication Data

US 2021/0031594 A1    Feb. 4, 2021

(30) Foreign Application Priority Data

Jul. 30, 2019 (DE) ...................... 10 2019 120 516.6

(51) Int. Cl.
*B60H 1/34* (2006.01)

(52) U.S. Cl.
CPC ..... *B60H 1/345* (2013.01); *B60H 2001/3471* (2013.01)

(58) Field of Classification Search
CPC .... B60H 1/3421; B60H 1/3414; B60H 1/345; B60H 2001/3471; B60H 2001/3478
See application file for complete search history.

(56) References Cited

U.S. PATENT DOCUMENTS

| | | | |
|---|---|---|---|
| 4,699,314 A * | 10/1987 | Faurie | F16K 31/002 137/875 |
| 10,195,924 B2 | 2/2019 | Doll | |
| 10,427,501 B2 * | 10/2019 | Paris | B60H 1/00564 |
| 10,899,200 B2 * | 1/2021 | Doll | B60H 1/3428 |
| 2005/0130577 A1 | 6/2005 | Alacqua | |
| 2017/0190240 A1 | 7/2017 | Paris | |
| 2018/0056756 A1 | 3/2018 | Schaal | |
| 2018/0319255 A1 | 11/2018 | Bastian | |

FOREIGN PATENT DOCUMENTS

| | | | |
|---|---|---|---|
| CN | 207859896 U | 9/2018 | |
| DE | 60 2004 001 842 T2 | 10/2007 | |
| DE | 10 2013 210 053 B3 | 9/2014 | |
| DE | 10 2015 017 008 B4 | 7/2017 | |
| DE | 102015017008 A1 * | 7/2017 | .......... B60H 1/3442 |
| DE | 10 2016 116 358 A1 | 3/2018 | |

(Continued)

OTHER PUBLICATIONS

Search Report for related German Application No. 10 2019 120 518.2, dated Mar. 4, 2020.

*Primary Examiner* — Steven S Anderson, II
(74) *Attorney, Agent, or Firm* — Renner, Otto, Boisselle & Sklar, LLP (57) ABSTRACT

An air vent for ventilating a passenger compartment of a motor vehicle. The air vent includes an air channel, which is divided, by an air splitter, into two partial air channels, which can be steplessly partially or completely blocked for air passing through, by blocking elements, which are pivotably mounted at the air splitter. The blocking elements may be displaced by way of a ram, which can be moved in the air splitter transversely to the air channel. Either one or the other blocking element can be selectively displaced by way of the ram. The respective other blocking element, in an open position, then rests against the outside of the air splitter.

9 Claims, 6 Drawing Sheets

(56) References Cited

FOREIGN PATENT DOCUMENTS

| | | |
|---|---|---|
| DE | 10 2016 014 132 A1 | 5/2018 |
| DE | 10 2017 124 874 A1 | 11/2018 |
| DE | 10 2017 128 105 A1 | 5/2019 |
| DE | 10 2018 105 747 A1 | 9/2019 |
| EP | 1084877 B1 | 3/2001 |
| FR | 3054491 B1 | 2/2018 |

* cited by examiner

AIR VENT

REFERENCE TO RELATED APPLICATIONS

This application claims priority under 35 USC § 119 to German Patent Application No. 10 2019 120 516.6, filed Jul. 30, 2019, the entire disclosure of which is incorporated herein by reference.

TECHNICAL FIELD OF THE INVENTION

The invention relates to an air vent.

Air vents are used to supply air to a passenger compartment of a motor vehicle. Air vents are typically disposed in a recessed manner in an instrument panel, a center console or trim parts of the passenger compartment, including an air outlet opening in a surface of the instrument panel, the center console, or the trim parts, which faces the passenger compartment.

The patent DE 10 2013 210 053 B3 discloses an air vent including an air channel having a rectangular cross-section, which is divided by an air splitter into two partial air channels, which initially diverge in an arc-shaped manner, and thereafter obliquely converge again in the direction of an air outlet opening. The air splitter is hollow so that air is also able to flow through the air splitter. Two air guide flaps, which can be pivoted parallel together, are disposed on an incident flow side of the air splitter which faces an air inlet opening. As a result of pivoting in one direction, one of the two partial air channels is partially, or with full displacement, completely blocked, so that the air flows obliquely out of the air vent.

SUMMARY OF THE INVENTION

It is the object of the invention to propose an air vent having different control of the air guide flaps or, in general terms, of the blocking elements.

The air vent includes an air channel in which an air splitter is disposed, which divides the air channel into a first partial channel and a second partial channel. The air vent according to the invention furthermore includes a first blocking element and a second blocking element. The first partial channel can be blocked by way of the first blocking element, and the second partial channel can be blocked by way of the second blocking element, so that essentially air is no longer able to flow through the blocked partial channel. The blocking elements can be pivotable air guide flaps or blocking slides, for example. The list is intended for illustrative purposes and is not exhaustive.

The blocking elements are disposed at the air splitter and displaceable in stages or steplessly, so that in each case one of the two partial channels can be blocked partially or completely. "To be blocked partially" shall be understood to mean a decrease in the air passage cross-section of the particular partial channel or, in any case, a reduction in the air volume flowing through the partial channel. In the completely blocked position, the blocking elements close the partial channels, however the blocking elements do not have to hermetically seal the partial air channels. "Displacing" shall be understood to mean a movement of the blocking elements within the meaning of a decrease in the air passage cross-section of the particular partial channel, and "restoring" or "opening" shall be understood to mean a movement of the blocking elements in the opposite direction. In principle, further partial channels and/or further blocking elements, which is to say more than two partial air channels and/or more than two blocking elements, are possible.

So as to displace the blocking elements, the air vent according to the invention includes a displacement element, which is disposed at or in the air splitter, by way of which one of the two blocking elements can be selectively displaced, so that either the first blocking element is displaced so as to partially or completely block the first partial air channel, or the second blocking element is displaced so as to partially or completely block the second partial air channel. The respective other blocking element is not displaced, or at least not by the displacement element. In each case, one of the two blocking elements can be partially or completely displaced so as to partially or completely block the associated partial air channel.

One advantage of the invention is that the air vent can be designed so that a blocking element is not displaced, but remains in a position in which a flow through the air vent is not influenced, or is influenced as little as possible, and in particular, is not swirled and/or restricted, or is swirled and/or restricted as little as possible.

The blocking elements preferably cannot be restored by way of the displacement element. One embodiment of the invention provides a ram or, in any case, a displacement element that rests against one side of the displaced blocking element during a displacement. "Resting against" shall be understood to mean here that no fixed connection has to exist between the displacement element and the blocking element, or the blocking elements, but that only contact or counter-pressing by way of the ram is caused.

The blocking element is displaced by the ram or, in general terms, the displacement element, being pressed against the blocking element.

Another embodiment of the invention provides a displacement element rotatable about a rotational axis, which includes a displacement surface which is oblique with respect to the rotational axis and against which one of the blocking elements rests. As a result of a rotation of the displacement element, and thus of the displacement surface, the orientation of the slope of the displacement surface with respect to the blocking element changes, whereby displacement of the blocking element is possible.

For example, the blocking elements can be air guide flaps, or other blocking elements, that are pivotably mounted at or in the air splitter, or blocking slides, or other blocking elements, that are movably guided at or in the air splitter.

The displacement element can preferably be moved into a position in which it does not protrude from the air splitter, which is to say in which it does not project into one of the partial air channels, but is located in the air splitter or is flush therewith. In the position in which the displacement element does not protrude from the air splitter, it preferably does not displace either of the two blocking elements. This position can also be referred to as the neutral position of the displacement element.

So as to restore the blocking elements counter to the displacement, one embodiment of the invention provides a restoring element, for example a spring element that, in particular, is mounted at the air splitter. It is possible for one restoring element to act upon both blocking elements in the restoring direction counter to the displacement, or one restoring element is provided for each blocking element.

Preferably, at least one of the blocking elements can be moved into an open position in which the blocking element rests in a planar manner against the air splitter. "Resting in a planar manner against" shall be understood to mean here that the blocking element rests in such a manner thereagainst that essentially no partial air current flows between the air splitter and the blocking element. The blocking element does not block, or only minimally constricts, the particular partial air channel in the process, in particular maximally around the thickness of the blocking element. In particular, the two blocking elements can be moved, in particular simultaneously, into an open position in which both rest in a planar manner against the air splitter.

The two partial air channels preferably obliquely converge toward the air outlet opening of the air vent, so that the partial air currents of the partial air channels superimpose at the air outlet opening. If the two partial air currents are identical in volume in the open position, the air flows out of the air vent in a straight manner when both partial air channels are open, and flows obliquely out of the air vent when one of the two partial air channels is partially or completely blocked. The two partial air channels can include dedicated air outlet openings, so that the air vent includes two air outlet openings, or the two partial air channels merge upstream of an air outlet opening of the air vent at or in the flow direction.

The features and feature combinations, designs and embodiments of the invention mentioned above in the description, and the features and feature combinations mentioned hereafter in the description of the figures and/or shown in a figure, can be used not only in the respective indicated or illustrated combinations, but also in other essentially arbitrary combinations, or alone. Embodiments of the invention that do not include all the features of a dependent claim are possible. It is also possible to replace individual features of a claim with other disclosed features or feature combinations. Embodiments of the invention that do not include all the features of the exemplary embodiment or exemplary embodiments, but an essentially arbitrary portion of the characterizing features of one exemplary embodiment, optionally in combination with one or more, or all the features of one or more further exemplary embodiments, are possible.

BRIEF DESCRIPTION OF THE DRAWINGS

The invention will be described hereafter in greater detail based on several exemplary embodiments shown in the drawings.

The figures show longitudinal sections of air vents according to the invention. The drawings are simplified and schematic illustrations to provide an understanding of and to describe the invention.

DETAILED DESCRIPTION OF THE INVENTION

The air vents 1 according to the invention shown in the drawings are provided to ventilate a passenger compartment of a motor vehicle, which is not shown. These are disposed in a recessed manner in an instrument panel, a center console or a trim part of the passenger compartment, so that an air outlet opening 2 of the air vent 1 is located in a surface of the instrument panel, of the center console or of the trim part which faces the passenger compartment, and the air vent 1 is located on a side of the surface of the instrument panel, of the center console or of the trim part which faces away from the passenger compartment.

In the exemplary embodiments, the air vents 1 include a tubular housing, which forms an air channel 3 of the air vents 1. In the exemplary embodiments, the air channel 3 has a rectangular tube-shaped cross-section. Starting at an air inlet opening 4 located opposite the air outlet opening 2, the air channel 3 initially has a constant cross-section, and thereafter widens in an arc-shaped manner in opposing directions, before narrowing again in a likewise arc-shaped manner toward the air outlet opening 2.

An air splitter 5 is disposed in the expanded section of the air channel 3, which divides the air channel 3 into two partial air channels 6, 7, which initially diverge in an arc-shaped manner, and thereafter, toward the air outlet opening 2, obliquely converge again. In the exemplary embodiments, the partial air channels 6, 7 have rectangular cross-sections and extend laterally reversed with respect to a longitudinal center plane of the air channel 3, perpendicularly to the drawing plane, which, however, is not mandatory for the invention. In the exemplary embodiments, the air splitter 5 has a symmetrical, curved flow profile, including an end face 25, which is perpendicular to the flow direction, on an outflow side facing the air outlet opening 2.

On an inflow side, two air guide flaps, which hereafter are referred to, in general terms, as a first blocking element 8 and as a second blocking element 9, are pivotably mounted at the air splitter 5. The "inflow side" refers to an incident flow side of the air splitter 5 facing the air inlet opening 4, in which the air splitter 5 widens in an arc-shaped manner. The two blocking elements 8, 9 are disposed on the sides of the air splitter 5 that face away from one another and delimit the partial air channels 6, 7.

Figure 1A:
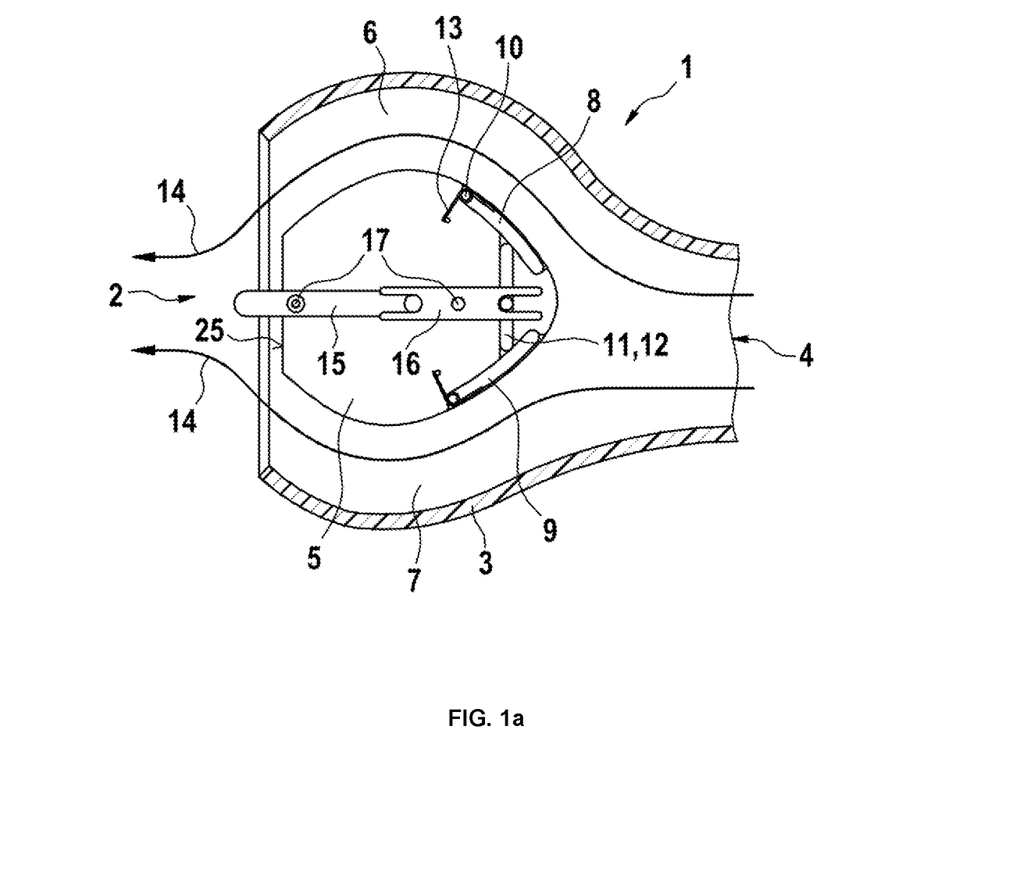
FIGS. 1a and 1b show a longitudinal sectional view of an air vent according to a first embodiment of the invention.
Figure 1B:
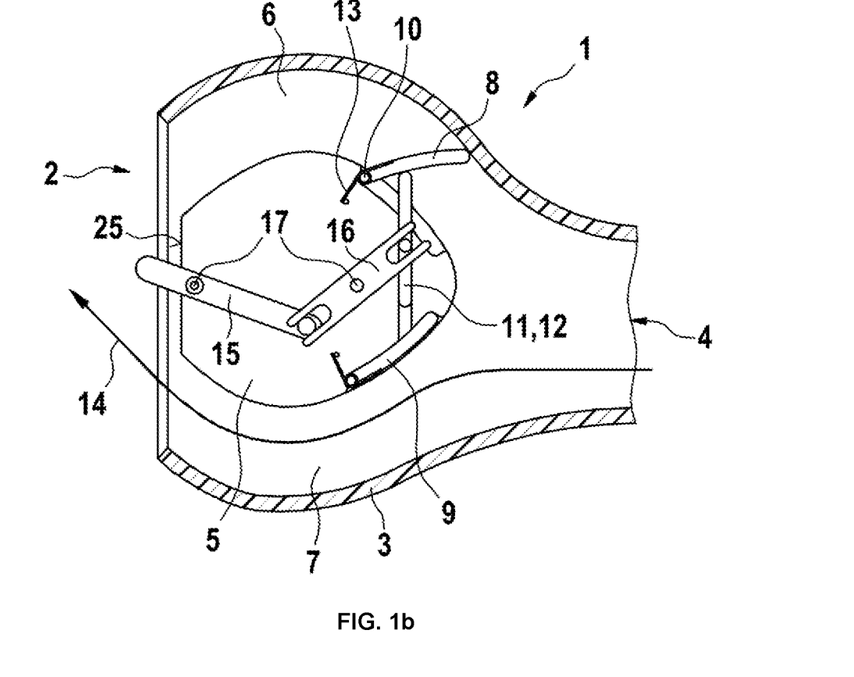

The first blocking element 8 is assigned to the first partial air channel 6, and is disposed on a side of the air splitter 5 which faces the first partial air channel 6. It has a curvature corresponding to the air splitter 5 and can be steplessly pivoted about the pivot axis 10 thereof out of an open position, which is shown in FIG. 1a and in which it leaves the first partial air channel 6 completely open, into a blocking position, which is shown in FIG. 1b and in which the first blocking element 8 completely blocks the first partial air channel 6, even though not necessarily in a hermetically sealed manner. Arbitrary intermediate positions, in which the first blocking element 8 partially blocks the first partial air channel 6, are possible. A movement of the first blocking element 8 in the direction of the blocking position is also referred to as a "displacement," and an opposite return movement in the direction of the open position is also referred to as a "restoration" of the first blocking element 8.

The above comments regarding the first blocking element 8 apply accordingly to the second blocking element 9 by way of which the second partial air channel 7 can be partially or completely blocked. However, the second blocking element 9 is shown in the open position in FIG. 1a and in FIG. 1b, and none of the figures show the blocking position.

The above comments apply to the air vents 1 of all illustrated exemplary embodiments of the invention. The control units are different, which is to say the displacement mechanisms of the blocking element 8, 9, which will be described hereafter.

So as to displace the blocking elements 8, 9, the air vent 1 according to the invention shown in FIGS. 1a, 1b includes a rod-shaped ram 11, which is disposed in the air splitter 5 between the two blocking elements 8, 9, transversely to the flow direction through the air vent 1, and is guided in the air splitter 5 so as to be movable, transversely to the flow direction, into the partial air channels 6, 7. FIG. 1a shows the ram 11 in a neutral position in which it does not protrude from the air splitter 5. It can be selectively moved so as to protrude from the air splitter 5 either into the first partial air channel 6 or into the second partial air channel 7. When the ram 11 protrudes into one of the two partial air channels 6, 7, one of the two ends thereof rests against a side of one of the blocking elements 8, 9 in the particular partial air channel 6, 7 which faces the air splitter 5, and displaces the blocking element 8, 9. The blocking element 8, 9 can be pivoted steplessly from the open position, which is shown in FIGS. 1a and 1n which it rests against the air splitter 5, into a blocking position, which FIG. 1b shows for the first blocking element 8, in which the particular air partial channel 6, 7 is blocked completely, even though not necessarily in a hermetically sealed manner, for air passing through. As a result of intermediate positions of the blocking elements 8, 9, it is possible to steplessly establish the size of a flow cross-section of the partial air channels 6, 7. The ram 11 can, generally speaking, also be interpreted as a displacement element 12 for displacing the blocking elements 8, 9.

Spring elements, which in the exemplary embodiment are torsion springs, act upon the two blocking elements 8, 9 in a restoring direction in which these rest against the air splitter 5. The spring elements can, generally speaking, also be interpreted as restoring elements 13, which hold the blocking elements 8, 9 so as to rest against the air splitter 5, at the end of the ram 11 forming the displacement element 12 which protrudes from the air splitter 5, or in the open position. It is not possible to restore the blocking elements 8, 9 by way of the ram 11. The blocking element 8, 9 is in the open position on the side of the air splitter 5 from which the ram 11 does not protrude, and rests against the air splitter 5. This is also the reason why only one of the two blocking elements 8, 9 at a time can be displaced.

When both blocking elements 8, 9, as shown in FIG. 1a, are in the open position, air flowing through the air channel 3 of the air vent 1 flows equally through the two partial air channels 6, 7 and exits the air vent 1 in a straight manner, which is to say in the longitudinal direction of the air channel 3, as is illustrated by the flow arrows 14. When one of the two blocking elements 8, 9 is partially or completely displaced, this partially or completely blocks the associated partial air channel 6, 7, and decreases the air flowing through this partial air channel 6, 7, whereby the air, as is illustrated by the flow arrow 14 in FIG. 1b, exits the air vent 1 obliquely.

So as to move the ram 11 forming the displacement element 12, and thus selectively displace either the first blocking element 8 or the second blocking element 9, the air vent 1 shown in FIGS. 1a, 1b includes a lever mechanism including two pivoting levers 15, 16. The two pivoting levers 15, 16 are mounted in the air splitter 5 so as to pivot, at approximately the centers thereof, about pivot axes 17 that are parallel to the pivot axes 10 of the blocking elements 8, 9. Mutually facing ends of the pivoting levers 15, 16 are connected in an articulated manner, and an end of the second pivoting lever 16 which faces away from a first pivoting lever 15 of the two pivoting levers 15, 16 is connected in an articulated manner to a center of the ram 11, so that the ram 11, as a result of pivoting of the two pivoting levers 15, 16, can be moved so as to protrude from the air splitter 5 either on the one side or on the other side, and displaces the blocking element 8, 9 disposed there in the above-described manner. The first pivoting lever 15 extends into the air outlet opening 2 of the air vent 1, and can be pivoted manually there.

Figure 2:
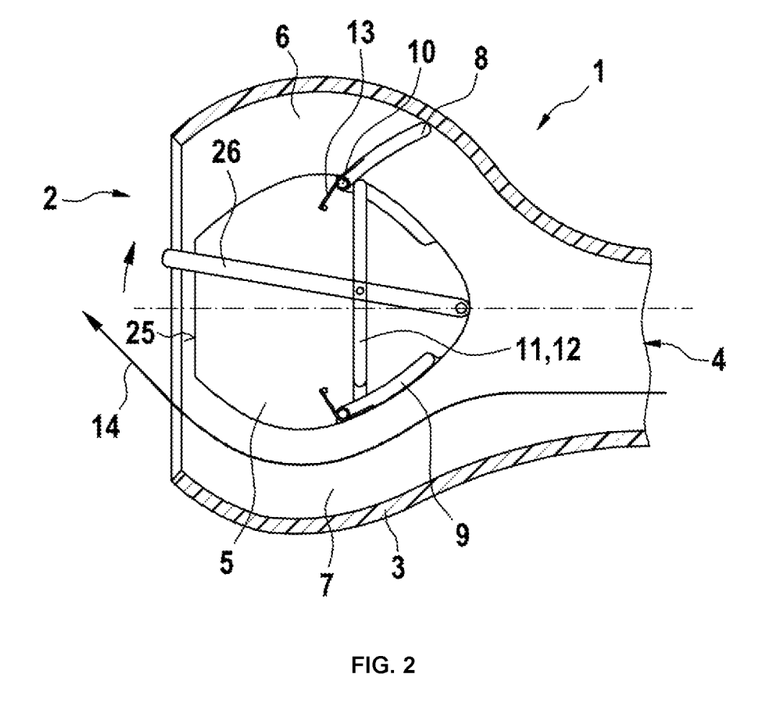
FIG. 2 is a longitudinal sectional view of an air vent according to a second embodiment of the invention.

Similarly to FIGS. 1a, 1b, the air vent 1 according to the invention shown in FIG. 2 includes a ram 11, serving as a displacement element 12, which is movably guided in the air splitter 5, transversely to the flow direction, so as to be selectively movable, protruding from the air splitter 5, either into the first partial air channel 6 or into the second partial air channel 7, and displacing either the first blocking element 8 or the second blocking element 9 in the process. FIG. 2 shows the first blocking element 8 as being displaced, and the second blocking element 9 as not being displaced, in the open position, in which it rests against the air splitter 5.

The ram 11 can be moved by way of a lever 26, which is disposed in the air splitter 5 and pivotably mounted at or near an incident flow side of the air splitter 5. The lever 26 intersects the ram 11 and, at the intersecting point, is connected to the ram 11 in an articulated manner. The lever 26 extends into the air outlet opening 2 of the air vent 1, where this can be pivoted manually and moves the ram 11 in the process.

While FIGS. 1a, 1b, 2 show manual displacement mechanisms for the ram 11 and the blocking elements 8, 9, the further exemplary embodiments of the invention include electromotive displacements.

Figure 3:
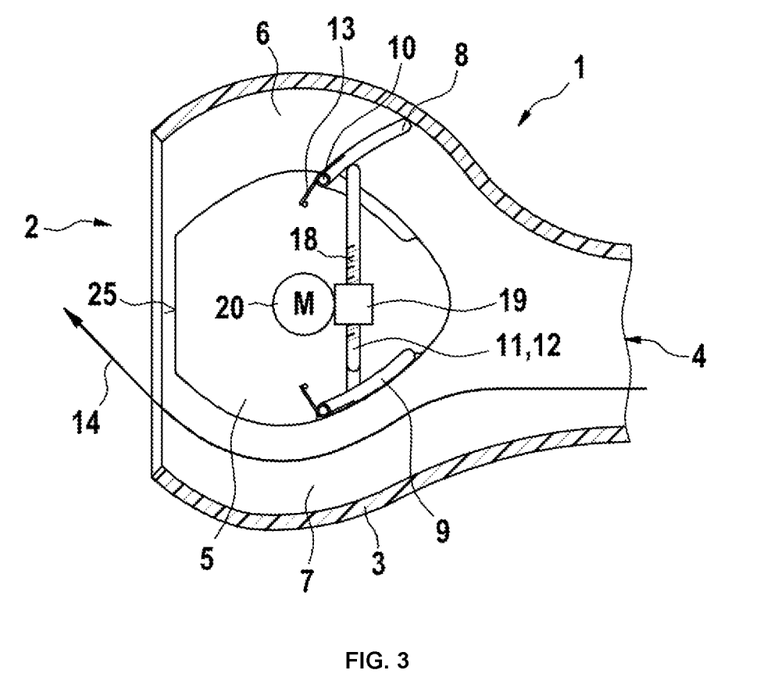
FIG. 3 is a longitudinal sectional view of an air vent according to a third embodiment of the invention.

In the exemplary embodiment of the invention shown in FIG. 3, the ram 11 forming the displacement element 12 includes a thread 18 in the center region thereof, and can therefore also be interpreted as a spindle. A spindle nut 19, with which the thread 18 is in engagement, can be rotatably driven by an electric motor 20, whereby the ram 11 can be moved. Otherwise, the displacement and the restoration of the blocking elements 8, 9 function as described above with respect to FIGS. 1a, 1b.

Figure 4:
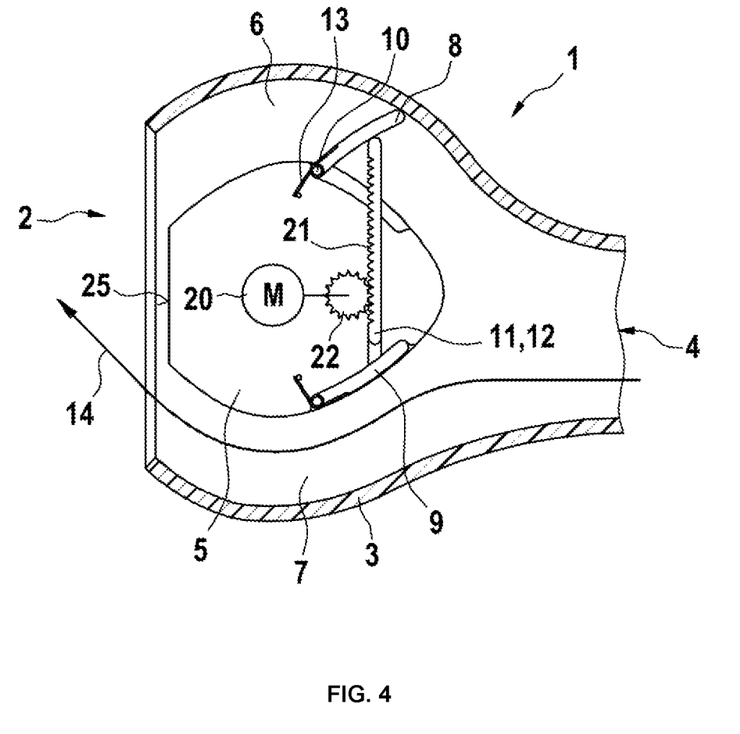
FIG. 4 is a longitudinal sectional view of an air vent according to a fourth embodiment of the invention.

In the exemplary embodiment of the invention shown in FIG. 4, the ram 11 forming the displacement 12 for the two blocking elements 8, 9 includes a straight tooth system 21, and can therefore also be interpreted as a toothed rack. The tooth system 21 meshes with a gear wheel 22, which can be rotatably driven by an electric motor 20, whereby the ram 11 can be moved in the air splitter 5, so that selectively either one end thereof protrudes from the air splitter 5 into the first partial air channel 6, or the other end thereof protrudes into the second partial air channel 7, and displaces either the first blocking element 8 or the second blocking element 9, as was described above with respect to FIGS. 1a, 1b.

Figure 5:
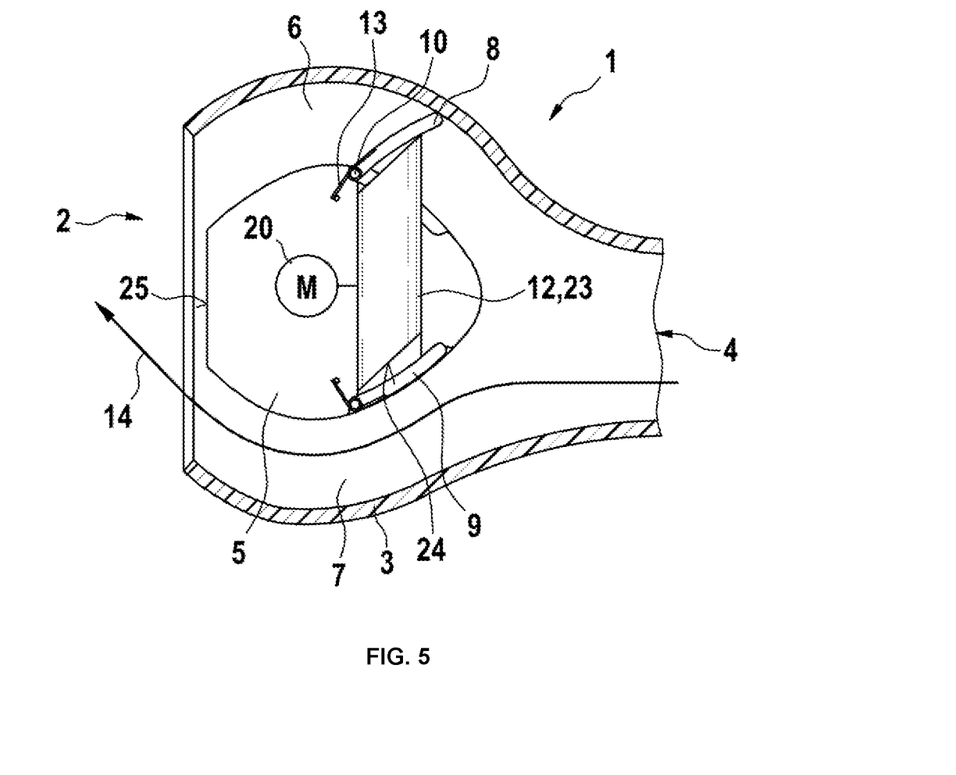
FIG. 5 is a longitudinal sectional view of an air vent according to a fifth embodiment of the invention.

In the exemplary embodiment of the invention shown in FIG. 5, instead of the ram 11 that can be moved transversely to the flow direction, a torsion bar 23, serving as the displacement element 12, is disposed in the air splitter 5, transversely to the flow direction through the air vent 1. The torsion bar 23 is mounted in the air splitter 5 so as to be rotatable about the axis thereof, and can be rotatably driven by an electric motor 20, End faces at the two ends of the torsion bar 23 extend parallel to one another, and obliquely at an angle with respect to the rotational axis of the torsion bar 23. The oblique end faces form oblique displacement surfaces 24 of the torsion bar 23 forming the displacement element 12.

As is apparent from FIG. 5, the torsion bar 23 can be rotated into a position in which one of the two displacement surfaces 24 protrudes partially, for example approximately one half of the displacement surface 24 protrudes from the air splitter 5 into one of the two partial air channels 6, 7. One of the two blocking elements 8 rests against a point of a peripheral edge of the displacement surface 24 and is displaced by the displacement surface 24, the peripheral edge of the displacement surface 24, or by the torsion bar 23 forming the displacement element 12.

The other end of the torsion bar 23 is located inside the air splitter 5, so that the associated blocking element 9 is held by the spring element, forming the restoring element 13, in the non-displaced open position in which it rests against the air splitter 5. In FIG. 5, the first blocking element 8 is displaced, and the second blocking element 9 is shown in the open position.

As a result of a rotation of the torsion bar 23 by 90°, no displacement surface 24 protrudes from the air splitter 5, so that the spring elements forming the restoring elements 13 hold both blocking elements 8, 9 in the non-displaced open position, in which these rest against the air splitter 5.

As a result of a rotation of the torsion bar 23 by another 90°, compared to the position shown in FIG. 5, which is to say by a rotation of 180°, the other, opposing displacement surface 24 protrudes partially from the air splitter 5, and displaces the other blocking element 9, 8.

As a result of smaller rotations of the torsion bar 23, each of the two blocking elements 8, 9 can be steplessly displaced in intermediate positions, in which these partially block the associated partial air channel 6, 7. Similarly to the other exemplary embodiments of the invention, either the first blocking element 8 or the second blocking element 9 can be selectively displaced, and the other blocking element 9, 8 is held by the restoring element 13 in the open position, in which this rests against the air splitter 5.

The invention claimed is:

1. An air vent, comprising an air channel in which an air splitter is disposed, which divides the air channel into a first partial air channel and a second partial air channel, comprising a first blocking element by way of which the first partial air channel can be partially or completely blocked, and a second blocking element by way of which the second partial air channel can be partially or completely blocked, the two blocking elements being disposed at the air splitter, wherein the air vent comprises a displacement element, which is disposed at or in the air splitter and by way of which one of the two blocking elements can be selectively displaced, so that either the first blocking element or the second blocking element is displaced, and either the first partial air channel or the second partial air channel is partially or completely blocked, wherein the blocking elements cannot be restored by way of the displacement element.

2. The air vent according to claim 1, wherein the displacement element is a ram and/or the displacement element rests against one side of the displaced blocking element during the displacement.

3. The air vent according to claim 1, wherein the displacement element can be rotated about a rotational axis and comprises a displacement surface that is oblique with respect to the rotational axis, which rests against one of the blocking elements and which displaces the blocking element during rotation of the displacement element.

4. The air vent according to claim 1, wherein the blocking elements are pivotably mounted at the air splitter.

5. The air vent according to claim 1, wherein the displacement element is movably guided at or in the air splitter.

6. The air vent according to claim 1, wherein the displacement element can be moved into a position in which this does not protrude from the air splitter.

7. The air vent according to claim 1, wherein the air vent comprises a restoring element for a blocking element, which acts upon the blocking element counter to a displacement.

8. The air vent according to claim 1, wherein a blocking element can be moved into an open position in which the blocking element rests against the air splitter in a planar manner.

9. The air vent according to claim 1, wherein the partial air channels converge obliquely, toward an air outlet opening.

* * * * *